April 19, 1927.
C. STOLLBERG
1,625,229
CAN BODY AND METHOD OF FORMING THE SIDE SEAM THEREOF
Filed April 16, 1925    2 Sheets-Sheet 1
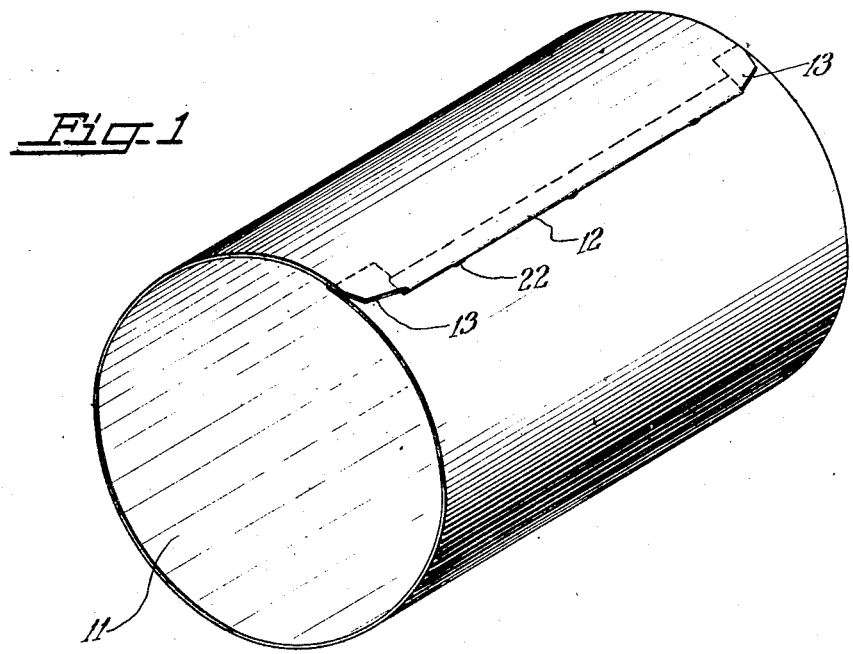
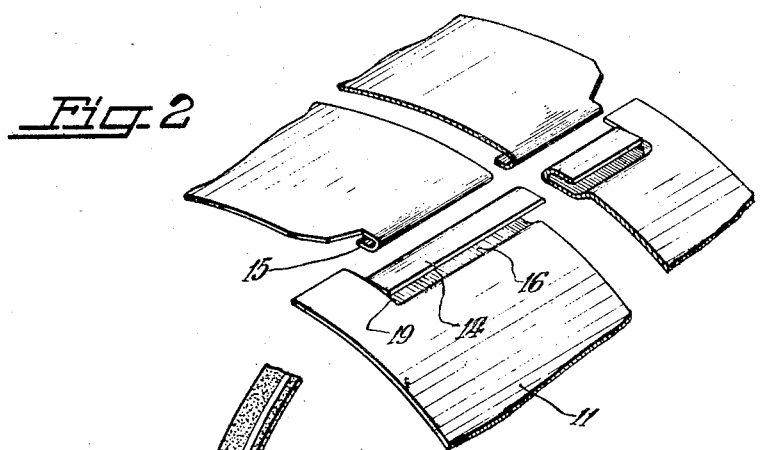
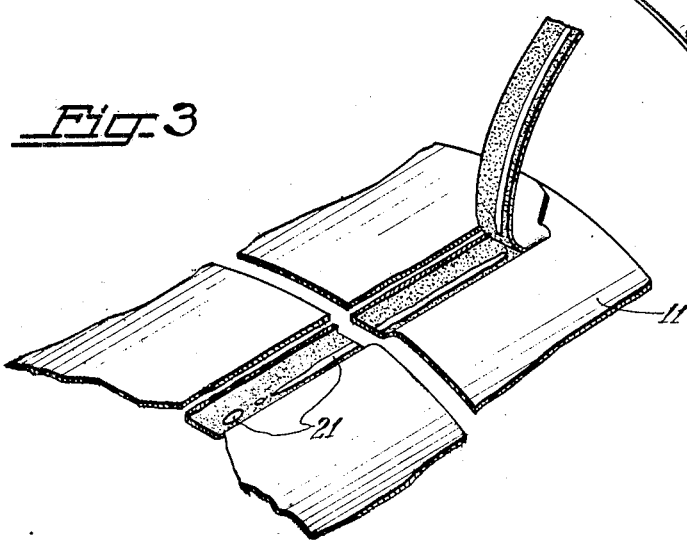
INVENTOR
Charles Stollberg
BY: Munday, Clarke &
Carpenter
ATTORNEY April 19, 1927.  C. STOLLBERG  1,625,229
CAN BODY AND METHOD OF FORMING THE SIDE SEAM THEREOF
Filed April 16, 1925   2 Sheets-Sheet 2
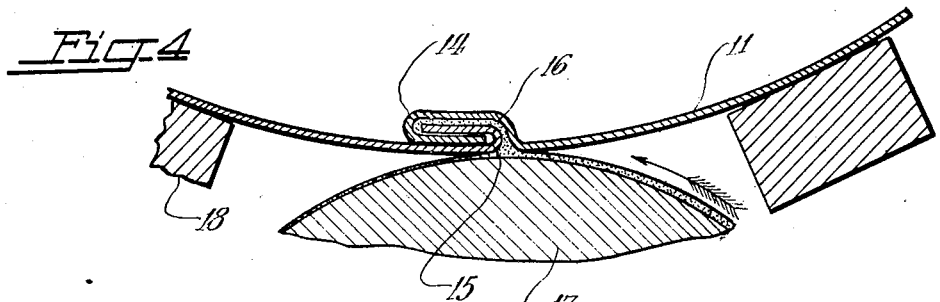
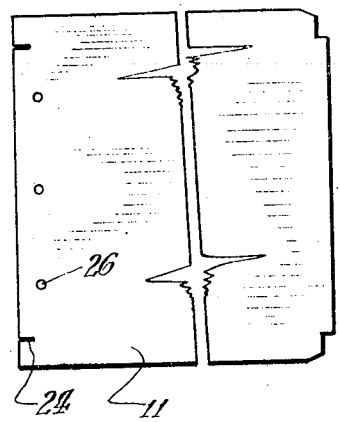
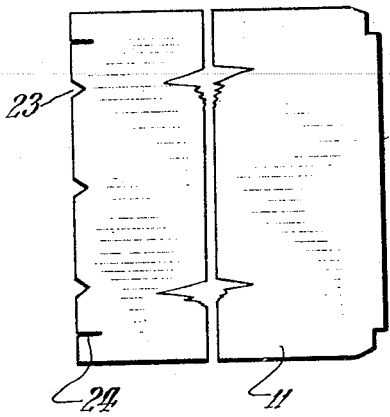
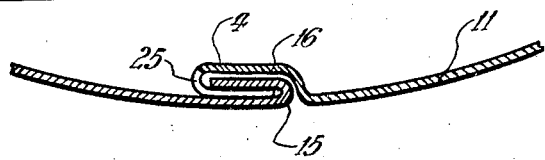
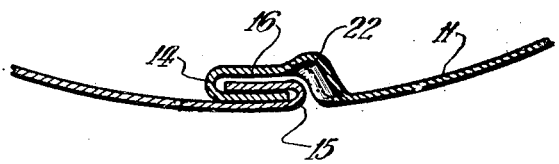
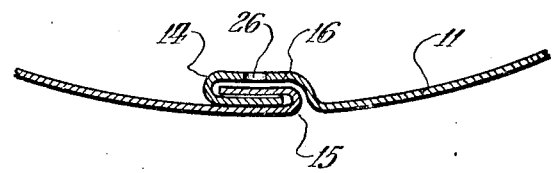
INVENTOR
Charles Stollberg
BY Munday,
Clarke & Carpenter
ATTORNEY Patented Apr. 19, 1927.

1,625,229

UNITED STATES PATENT OFFICE.

CHARLES STOLLBERG, OF NEW YORK, N. Y., ASSIGNOR TO AMERICAN CAN COMPANY, OF NEW YORK, N. Y., A CORPORATION OF NEW JERSEY.

CAN BODY AND METHOD OF FORMING THE SIDE SEAM THEREOF.

Application filed April 16, 1925. Serial No. 23,478.

My invention relates to the manufacture of cans, and more particularly to the method of forming the side seam thereof.

With the recent developments of can making machinery, there has been a marked increase in the speed attainable in the processes of manufacture and, whereas only a few years ago the rate of production for one machine was about 100 cans per minute, it is not unusual, with the new machinery, to produce upon a single automatic machine 300 cans per minute. With this enormous speed, certain difficulties have been encountered, one of which is the trapping of air within the side seam of the can body when the solder is applied thereto, with the result that unsoldered spaces, or "islands", occur in the seam and impair the strength thereof. This difficulty has been experienced more particularly in connection with the so-called "lock and lap" type of seam, in which the central portions of the opposed edges are interengaged and the end portions are merely lapped. This form of seam has been found to be stronger and more efficient than the so-called "lap" seam, but inasmuch as the ends of the lock portion of the seam are closed when said edges are interengaged, there is more likelihood of trapping the air during the soldering operation, since it cannot readily escape as in the case of a lap seam. When the solder is applied at the very rapid rate now attained, the ends of said lock portion of the seam are instantaneously closed off, or sealed by the solder, which, passing edgewise into the central part of the seam, in some cases actually pockets or entraps a certain amount of air. This entrapped air, being subject to the intense heat of the solder bath, rapidly expands and thus forms an increased barrier to the entrance of solder into the seam, with the result heretofore mentioned.

The purpose of my invention is to overcome this difficulty by providing for the escape of the air from the seam during operations thereon which might tend to entrap it, the operation particularly affected being that of soldering, as hereinbefore indicated.

Numerous other objects and advantages of the invention will be apparent as it is better understood from the following description, which, taken in connection with the accompanying drawings, discloses a preferred embodiment thereof.

Referring to the drawings,

Figure 1 is a perspective view of a can body formed with a lock and lap seam embodying the preferred form of my invention, which preferred form is further illustrated in Fig. 5;

Fig. 2 is a perspective fragmentary view of the opposed edges entering into the lock and lap seam, the view illustrating the parts in separated relationship for the purpose of clearly disclosing the channel for reception of the solder;

Fig. 3 is a perspective fragmentary view of a soldered side seam, partially torn open, the view illustrating the imperfect sweating of the seam and the "islands" caused by the trapping of air within the inner folds of the seam;

Fig. 4 is a cross-sectional view of a portion of the can body within a forming mandrel and illustrating the manner in which the solder is applied to the seam by the solder roll;

Fig. 5 is a partial sectional view of a can body, showing the preferred form of side seam illustrated in Fig. 1 before the solder has been applied;

Fig. 6 is a broken plan view of a can body blank of modified edge form;

Fig. 7 is a partial sectional view showing the seam produced by the form of blank shown in Fig. 6;

Fig. 8 is a broken plan view of another modified form of blank; and

Fig. 9 is a view corresponding to Figs. 5 and 7, showing the modified form of blank illustrated in Fig. 8.

Upon said drawings, illustrating the best manner in which I have thus far contemplated applying the principles of my invention, the reference character 11 indicates a can body formed with a lock and lap seam, the lock portion being indicated, generally, by the reference character 12 and the lap portions by the character 13. The edges of the body 11 are hooked at 14 and 15 (see Fig. 2) and are adapted to be interengaged, as shown in Figs. 5, 7 and 9, prior to the application of the solder. A channel 16 is formed in the edge having the hooked portion 14 and is adapted to receive solder from a solder applying roll 17 in the manner illustrated in Fig. 4. Said solder applying roll is ordinarily arranged as a part of or in line with the body making machine and is adapted to rotate beneath the side seam, in the direction indicated by the arrow, the can body being supported within a mandrel indicated by the reference character 18. The solder is thereby carried up from a solder bath, and directed into the channel 16.

As heretofore stated, the projection of the solder into said channel at the high rate of speed of the present machines tends to close off the end parts 19 of the channel 16, as well as the forward edge thereof, thus preventing the escape of air contained within the folds of the seam, with the result that unsoldered spaces or "islands," indicated by the reference character 21 in Fig. 3, occur. Obviously, this impairs the effectiveness of the bond and, as previously stated, the difficulty is aggravated by the fact that the great heat produced by the molten solder causes expansion of the air, thus increasing the size of the unsoldered spaces.

In accordance with the preferred form of my invention, depressions 22 are formed in the body blank 11 at the edge of the channel 16, these depressions serving to establish communication with said channel while the solder is being directed into the latter and permitting the air to be driven out by the incoming solder, which not only completely fills the channel 16, but finally fills the depressions 22. Said depressions are, therefore, unobjectionable and practically unnoticeable in the completely formed seam. In the form of the invention illustrated in Figs. 6 and 7, the side of the body blank 11 in which the channel 16 is formed is notched, as indicated at 23, intermediate the usual slits 24, these notches providing passages, as shown at 25 in Fig. 7, through which the air may pass as the solder is directed in from the opposite side of the channel. Another form of blank construction suitable for attaining the objects of the invention is shown in Fig. 8 and consists of the usual blank provided with apertures 26 at intervals in the length thereof which are disposed in the position shown in Fig. 9. After the hooked portions of the seam have been interengaged, obviously the air may escape through these apertures during the soldering operation and the apertures will be completely filled by the solder so that they will not be objectionable in the finished can.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. The method of forming side seams of can bodies, which consists in interengaging the edges of a blank provided with air vents in the seam area, and applying solder in fluid condition and from the exterior of the seam to the interengaged edges in direction to drive the air therefrom through said vents.

2. The method of forming side seams of can bodies which consists in interengaging the edges of a blank provided with air vents in the seam area, and directing solder in fluid condition and from the exterior of the seam into the seam in direction to drive air which might otherwise be trapped therein out through said vents.

3. The method of forming side seams of can bodies which consists in interengaging the edges of a blank provided with a vent adapted to permit the escape of air from the seam when solder in fluid condition is applied externally to the seam and flows into the same.

4. The method of forming side seams of can bodies which consists in interengaging the edges of a blank provided with a vent adapted to permit the escape of air from the seam, and thereafter applying solder in fluid condition and from the exterior of the seam to said seam in direction to drive air which might otherwise be trapped therein out through said vent.

5. The method of forming side seams of can bodies which consists in interengaging the edges of a blank provided with a plurality of air vents formed at intervals in the length of the seam and adapted to permit escape of air therefrom when solder in fluid condition is applied externally to the seam and flows into the same.

6. The method of forming side seams of can bodies which consists in interengaging the edges of a blank provided with a plurality of air vents formed at intervals in the length of the seam and adapted to permit escape of air therefrom, and subsequently applying solder in fluid condition and from the exterior of the seam to said seam in direction to drive air which might otherwise be trapped therein out through said vents.

7. The method of forming lock and lap side seams on can bodies which consists in interengaging the hooked portions of the blank edges, the latter being provided with air vents at intervals in the length thereof, and applying solder in fluid condition and from the exterior of the seam to the seam in direction to drive air which might otherwise be trapped therein out through said vents.

8. A can body blank, comprising a body having hooked edges adapted to be interengaged to form a side seam and being provided with an air vent in the seam area to permit escape of air from said seam during the process of closing the latter when solder in fluid condition is applied externally to the seam and flows into the same.

9. A can body blank, comprising a body having hooked edges adapted to be interengaged to form a side seam and being provided with a plurality of air vents in the seam area to permit escape of air from said seam during the process of closing the latter when solder in fluid condition is applied externally to the seam and flows into the same.

10. A can body blank, comprising a body having hooked edges adapted to be interengaged to form a side seam and being provided with a plurality of air vents formed at intervals in the length of the seam to permit escape of air during the process of closing said seam when solder in fluid condition is applied externally to the seam and flows into the same.

11. A can body blank, comprising a body part having opposed edges hooked throughout a part only of the length thereof, the hooked portions of the edges being adapted to be interengaged to form the lock part of the seam and the remaining portions of said seam adapted to be merely lapped to form the lap portion of the seam, said blank being provided with vents in the seam area adapted to permit escape of air from said seam during the process of closing the latter.

CHARLES STOLLBERG.